US012763058B2

(12) United States Patent
Rui et al.

(10) Patent No.: US 12,763,058 B2
(45) Date of Patent: Oct. 13, 2026

(54) ADAPTIVE HOWLING SUPPRESSION FOR ACTIVE NOISE CONTROL SYSTEMS

(71) Applicant: Google LLC, Mountain View, CA (US)

(72) Inventors: Liyang Rui, Irvine, CA (US); Guohua Sun, Santa Clara, CA (US); Lyle Nitta, Westminster, CO (US)

(73) Assignee: GOOGLE LLC, Mountain View, CA (US)

( * ) Notice: Subject to any disclaimer, the term of this patent is extended or adjusted under 35 U.S.C. 154(b) by 345 days.

(21) Appl. No.: 18/486,267

(22) Filed: Oct. 13, 2023

(65) Prior Publication Data

US 2025/0124909 A1 Apr. 17, 2025

(51) Int. Cl.
*G10K 11/175* (2006.01)
*H04R 1/10* (2026.01)

(52) U.S. Cl.
CPC ......... *G10K 11/175* (2013.01); *H04R 1/1083* (2013.01)

(58) Field of Classification Search
CPC ........... G10K 11/175; G10K 11/17833; G10K 11/17835; G10K 2210/1081; G10K 11/17881; G10K 2210/3056; H04R 1/1083; H04R 1/1041; H04R 2460/01
USPC ......................................................... 381/73.1
See application file for complete search history.

(56) References Cited

U.S. PATENT DOCUMENTS

| | | | | |
|---|---|---|---|---|
| 10,834,494 | B1 * | 11/2020 | Tong | G10K 11/17827 |
| 11,240,601 | B1 | 2/2022 | Saplakoglu | |
| 12,262,184 | B2 * | 3/2025 | Yu | G10K 11/178 |
| 2017/0148428 | A1 | 5/2017 | Thuy et al. | |
| 2018/0242082 | A1 * | 8/2018 | Hua | G10K 11/17857 |
| 2019/0058952 | A1 | 2/2019 | Nawfal et al. | |
| 2019/0139532 | A1 * | 5/2019 | Zhou | G10K 11/17881 |

FOREIGN PATENT DOCUMENTS

| | | |
|---|---|---|
| CN | 113973246 | 1/2022 |

* cited by examiner

*Primary Examiner* — Carolyn R Edwards
*Assistant Examiner* — Friedrich Fahnert
(74) *Attorney, Agent, or Firm* — DORITY & MANNING, P.A.

(57) ABSTRACT

Adaptive howling suppression is provided for active noise control (ANC) systems of wearable audio components (WACs), such as earbuds, based on detecting whether the WACs are presently being worn. Upon first detecting howling, embodiments can pre-suppress the howling audio signature by reducing ANC output. Then, embodiments detect whether the WAC is presently on-ear (worn) or off-ear and attempt to fully suppress the howling using different parameters, based on this detection. For example, if on-ear, embodiments use on-ear tuning settings to cycle through a set of suppression stages until ANC output can be restored without howling; if off-ear, embodiments use off-ear tuning settings to cycle through the set of suppression stages until ANC output can be restored without howling. Once ANC output can be restored without howling, the system can be released to a normal idle state.

20 Claims, 8 Drawing Sheets

ADAPTIVE HOWLING SUPPRESSION FOR ACTIVE NOISE CONTROL SYSTEMS

BACKGROUND

Active noise control (ANC) is a common feature of headsets and earbuds. It operates by generating an anti-noise signal via a speaker that is approximately equal in magnitude, but opposite in phase to the ambient noise. The ambient noise and anti-noise signal cancel each other acoustically, allowing the user to hear only a desired audio signal. Typically, signal processing in ANC includes two paths: an ambient noise signal from a reference microphone is taken as the input of a feed-forward ANC filter (FFANC); and an error microphone signal is taken as the input of a feedback ANC filter (FBANC).

Based on the design principle of ANC, howling can happen when the acoustic channel from the speaker to the microphone is drastically changed. For example, when a wearer wraps their hands around the earbuds while wearing the earbuds, a sealed acoustic space is created around the earbuds. This can cause the sound from the earbud's speakers to feed back to the earbud's microphones and to be re-amplified and re-emitted in a feedback loop, thereby resulting in a high-pitched squealing or howling noise. It can be desirable to suppress such howling as quickly as possible by disabling ANC, but also to restore ANC as quickly as possible when the howling is no longer an issue.

SUMMARY

Systems and methods are described for adaptively suppressing howling in active noise control (ANC) systems of wearable audio components (WACs) based on detecting whether the WACs are presently being worn. Upon first detecting howling, embodiments can pre-suppress the howling audio signature by reducing ANC output. Then, embodiments detect whether the WAC is presently on-ear (worn) or off-ear and attempt to fully suppress the howling using different parameters, based on this detection. For example, if on-ear, embodiments use on-ear tuning settings to cycle through a set of suppression stages until ANC output can be restored without howling: if off-ear, embodiments use off-ear tuning settings to cycle through the set of suppression stages until ANC output can be restored without howling. Once ANC output can be restored without howling, the system can be released to a normal idle state.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Active noise control (ANC) operates in earbuds by generating an anti-noise signal via a speaker that is approximately equal in magnitude, but opposite in phase to the ambient noise. The ambient noise and anti-noise signal cancel each other acoustically, allowing the user to hear only a desired audio signal. Typically, signal processing in ANC includes two paths: an ambient noise signal from a reference microphone is taken as the input of a feed-forward ANC filter (FFANC); and an error microphone signal is taken as the input of a feedback ANC filter (FBANC). Based on the design principle of ANC, howling can happen when the acoustic channel from the speaker to the microphone is drastically changed, such as when a wearer wraps their hands around the earbuds.

It can be desirable to suppress such howling as quickly as possible by disabling ANC. Conventionally, two categories of techniques are used to suppress such howling: feedforward suppression, and feedback cancellation. In feedforward suppression techniques, the signal processing path is modified to be stable in conjunction with the acoustic channel change. Common feedforward suppression techniques include notch filtering, open-loop phase response equalization, and time-varying modulation. While these feedforward suppression techniques can suppress howling, they also tend to compromise the basic frequency response of the ANC filter and can appreciably affect ANC performance. Feedback cancellation techniques operate by producing an estimate of the acoustic echo and subtracting the estimate from a microphone signal. As a result, the microphone-speaker-microphone loop is modified and stability is achieved. However, to maintain effectiveness, the feedback canceller must continually adapt to changes in the acoustic echo channel, which can vary significantly depending on the acoustic environment. For example, sounds from jaw movement, wind, or the like, can cause the feedback canceller to generate artificial sounds when its adaptation is too fast. Further, although feedback cancellation techniques can suppress FFANC howling, they cannot suppress FBANC howling.

Figure 1:
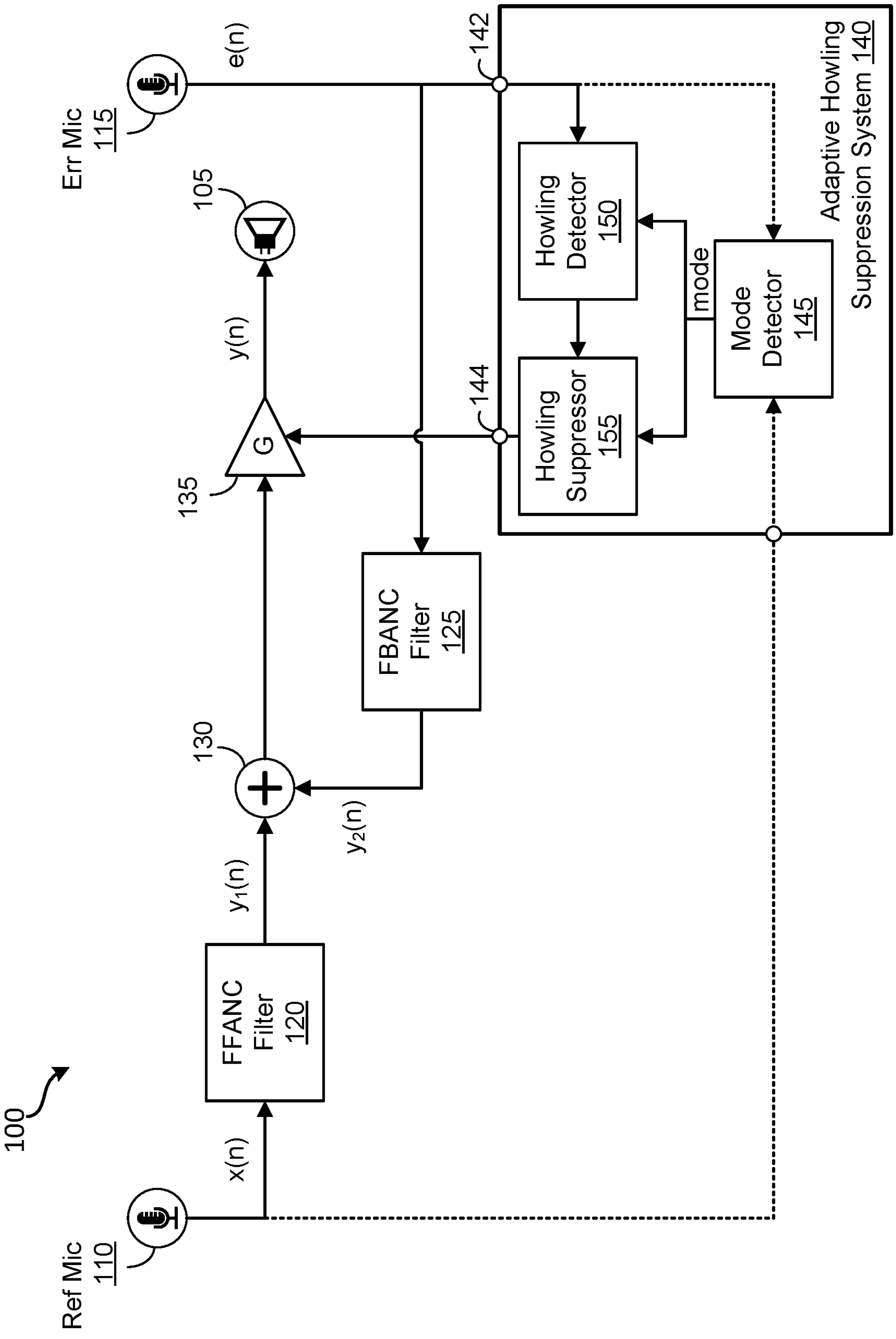
FIG. 1 shows a circuit block diagram of an illustrative active noise control (ANC) system that includes adaptive howling suppression, according to embodiments described herein.

Turning to FIG. 1, a circuit block diagram is shown of an illustrative active noise control (ANC) system 100 that includes adaptive howling suppression, according to embodiments described herein. It is assumed that the ANC system 100 is integrated in an earbud, or other wearable audio component. In general, the ANC system 100 operates to enhance hearing of a desired audio signal by reducing unwanted ambient noise, thereby improving the overall listening experience for a wearer. As illustrated, the ANC system 100 includes a speaker 105, a reference microphone 110, an error microphone 115, a feed-forward ANC (FFANC) filter 120, a feedback ANC (FBANC) filter 125, a summer 130, an ANC gain block 135, and an adaptive howling suppression (AHS) system 140.

Embodiments of the speaker 105 generally convert an electrical audio signal into sound waves that are delivered to the ear of the wearer of the wearable audio component. As noted above, the goal of the ANC system 100 is generally to deliver the electric audio signal to the speaker 105 in a manner that maximizes the desired audio signal and minimizes ambient noise for the wearer. Embodiments of the reference microphone 110 can be an omnidirectional microphone typically integrated with an outer casing of the wearable audio component. The reference microphone 110 captures a combined audio signal including both the desired audio (e.g., music, speech, etc.) and surrounding ambient noise. This captured reference signal is illustrated as x(n). Embodiments of the error microphone 115 are typically integrated with the inner casing of the wearable audio component to be positioned inside the ear canal or very close to it when the wearable audio component is being worn. The error microphone 115 captures the audio that reaches the eardrum, which includes the desired audio signal and any remaining ambient noise. This captured error signal is illustrated as e(n).

The illustrated ANC system 100 includes a feed-forward noise control path and a feedback noise control path. The feed-forward noise control path includes the FFANC filter 120, which is a digital or analog filter designed to process the audio signal from the reference microphone 110. The FFANC filter 120 applies a specific frequency response to x(n) to adaptively cancel out noise. The specific frequency response is produced by continuously adjusting coefficients of the FFANC filter 120 to minimize the difference between the desired audio signal and the reference signal. The output of the FFANC filter 120 is illustrated as $y_1(n)$. The feedback noise control path includes the FBANC filter 125, which is a digital or analog filter designed to process the audio signal from the error microphone 115. The FBANC filter 125 applies a specific frequency response to e(n), and continuously adjusts coefficients of the FBANC filter 125 to minimize the difference between the desired audio signal and remaining ambient noise in the signal that reaches the eardrum. The output of the FFANC filter 120 is illustrated as $y_2(n)$. In general, both the FFANC filter 120 and the FBANC filter 125 can adapt their respective filters (e.g., their coefficients) in real-time to a changing audio environment. For example, filter coefficients are iteratively adjusted using least mean squares (LMS), normalized LMS (NLMS), and/or other suitable adaptation algorithms.

Embodiments of the summer 130 combine the filtered output signals from the FFANC filter 120) and the FBANC filter 125. For example, the summer 130 calculates a sum of these signals. If tuned properly, the output of the summer 130 is an "anti-noise" signal that closely represents the ambient noise at opposite polarity. Embodiments of the ANC gain block 135 include an amplifier to provide a controllable amount of gain (G) to the signal at the output of the summer 130, resulting in an output signal, $y(n)=G(y_1(n)+y_2(n))$. In effect, the ANC gain block 135 adjusts the overall amplitude (i.e., corresponding to volume) of the combined filtered signal at the output of the summer 130. The output signal is sent to the speaker 105. In some implementations, the desired audio signal can also be mixed in prior to sending the output to the speaker 105 (e.g., at the summer 130), such that what reaches the eardrum is almost entirely the desired audio signal with minimal ambient noise.

As described above, howling (e.g., a high-pitched squeal) can happen when the acoustic channel from the speaker 105 to the microphone (e.g., the reference microphone 110) is drastically changed. One category of situations, referred to herein as "on-ear" conditions, occur while a user is wearing the wearable audio component (e.g., when an earbud is in the user's ear). One such on-ear condition can occur when users wrap their hands around a wearable audio component while wearing the wearable audio component. For example, when a user seeks to adjust an earbud in her ear, her hand may inadvertently create an acoustical shell around the earbud. Similarly, while a user is wearing the wearable audio component, wind, jaw movements, or other ambient changes can affect the acoustic channel enough to cause howling. Another category of situations, referred to herein as "off-ear" conditions, occur while a user is not wearing the wearable audio component. One such off-ear condition can occur when a user holds an earbud in her hand so that her hand may inadvertently create an acoustical shell around the earbud. Another such off-ear condition can occur when a user places an earbud in her pocket, in a case or dock, etc. while the earbud is still playing audio. The on-ear or off-ear conditions can include any on-ear or off-ear condition that changes the acoustic channel enough to create a reinforcing speaker-microphone-speaker feedback loop and resulting in howling.

Embodiments of the AHS system 140 seek to detect howling, detect whether the wearable audio component is in an on-ear or an off-ear condition, and suppress the detected howling in a manner that is adapted to the detected condition. As illustrated, the AHS system 140) includes a mode detector 145, a howling detector 150, and a howling suppressor 155. The howling detector 150 detects howling based on the error microphone 115 signal, e(n). Several techniques can be used, alone or in conjunction with each other, to detect howling.

Some embodiments of the howling detector 150 are configured to detect howling based on detecting a peak/neighbor ratio, $d_{h1}$. The howling sound is usually a narrow band tone signal. As such, howling can manifest as a strong and narrow peak in the power spectrum of e(n). A peak/neighbor ratio can be computed as $d_{h1}=|E_h|-E_{h-j}|$, where $E_h$ is the highest peak in the power spectrum of e(n), and j defines the neighbor frequency range and is tunable. Detecting that this ratio has exceeded a predetermined peak/neighbor threshold ($D_{h1}$) can indicate that howling is present (i.e., $d_{h1}>D_{h1}$).

Other embodiments of the howling detector 150 are configured to detect howling based on detecting a harmonic peak ratio, $d_{h2}$. In the power spectrum of e(n), there will typically be only one strong howling peak before e(n) is saturated. On the contrary, natural tones, even such as whistles, tend to have strong peaks at the harmonic frequencies. A main-peak-to-harmonic-peak ratio can be computed as $d_{h2}=|X_h|-|X_{h(2)}|$, where is $X_{h(2)}$ is the second highest peak in the spectrum. Detecting that this ratio has exceeded a predetermined harmonic peak threshold ($D_{h2}$) can indicate that howling is present (i.e., $d_{h2}>D_{h2}$).

Other embodiments of the howling detector 150 are configured to detect howling based on detecting a number of "out-of-limit" samples $\gamma_{h1}$. The out-of-limit samples are those having amplitudes beyond a predefined amplitude limit. When howling happens, the loudness of e(n) is expected to be high and continuously increasing until saturation. Howling can be detected by detecting that the number of out-of-limit samples exceeds a pre-calibrated limit threshold, $\Gamma_{h1}$ (i.e., $\gamma_{h1}>\Gamma_{h1}$).

Some embodiments of the howling detector 150 are configured to detect howling based on detecting any one of the above conditions as follows:

$H_1$(howling): $d_{h1}>D_{h1}$ or $d_{h2}>D_{h2}$ or $\gamma_{h1}>\Gamma_{h1}$;

$H_0$(no howling): otherwise.

Other embodiments of the howling detector 150 are configured to detect howling only when all three of the above conditions are detected as follows:

$H_1$(howling): $d_{h1}>D_{h1}$ and $d_{h2}>D_{h2}$ and $\gamma_{h1}>\Gamma_{h1}$;

$H_0$(no howling): otherwise.

Other embodiments of the howling detector 150 are configured to detect howling based on detecting any two of the above conditions as follows:

$H_1$(howling): $d_{h1}>D_{h1}$ and $d_{h2}>D_{h2}$; or $d_{h1}>D_{h1}$ and $\gamma_{h1}>\Gamma_{h1}$; or $d_{h2}>D_{h2}$ and $\gamma_{h1}>\Gamma_{h1}$;

$H_0$(no howling): otherwise.

The thresholds, $D_{h1}$, $D_{h2}$, and $\Gamma_{h1}$, are referred to herein as detection parameters, and each is a tunable threshold. Reducing the values of the detection parameters configures the howling detector 150 for reduced detection latency, but also tends to result in an increased false trigger rate. Increasing the values of the detection parameters configures the howling detector 150 for increased detection latency (i.e., longer detection time), but also tends to result in a decreased false trigger rate. Such tuning of the detection parameters is also referred to herein as tuning the howling detector 150.

Figure 2A:
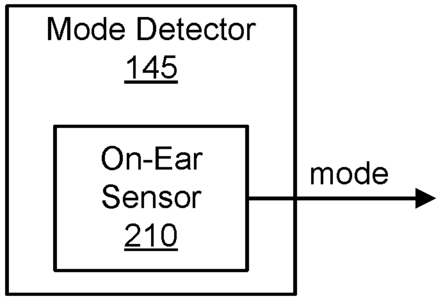
FIG. 2A shows an illustrative implementation of a mode detector based on an on-ear sensor integrated therein.
Figure 2B:
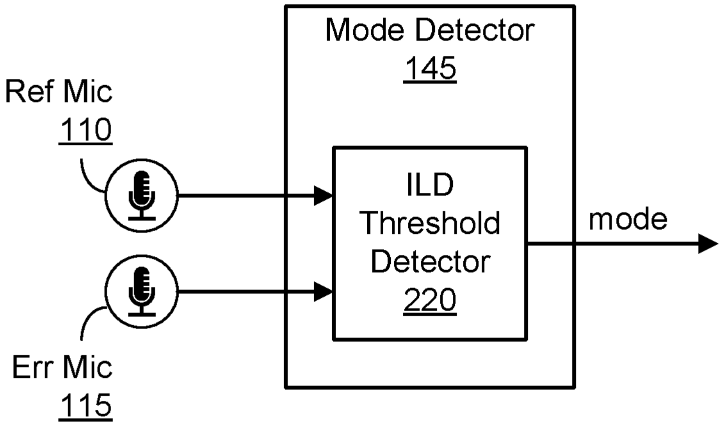
FIG. 2B shows another illustrative implementation of a mode detector based on an inter-channel level difference (ILD) threshold detector integrated therein.

Embodiments of the mode detector 145 determine whether the wearable audio component is in an on-ear or an off-ear condition and outputs a mode selection signal (mode), accordingly, to the howling suppressor 155 and/or to the howling detector 150. The mode detector 145 can be implemented in any suitable manner that can distinguish between on-ear and off-ear conditions with sufficient reliability. FIGS. 2A and 2B illustrate two approaches.

FIG. 2A shows an illustrative implementation of a mode detector 145 based on an on-ear sensor 210 integrated therein. Embodiments of the on-ear sensor 210 detect whether there is an on-ear condition (e.g., and/or whether there is an off-ear condition, and/or whether there is not an on-ear condition, and/or whether there is not an off-ear condition) and output the mode selection signal, accordingly. On-ear sensors 210 have been integrated into earbuds, and other wearable audio components, for various purposes, such as to cause the earbuds automatically to stop play back when removed from the ears and/or automatically to commence playback when inserted into the ears. On-ear sensors 210 can be implemented based on several sensor technologies. Some on-ear sensors 210 are implemented as capacitive sensors that measure changes in capacitance (e.g., bio-capacitance) to detect presence of, or contact with, the ear. For example, contact between the sensor and the ear causes a change in capacitance, which indicates whether an on-ear condition is present. Some such sensors can use more advanced techniques to detect a particular change in capacitance that is indicative of an ear (i.e., an on-ear condition) versus other objects, such as a user's hand, a case or dock, etc. (i.e., an off-ear condition). Other on-ear sensors 210 are implemented as proximity sensors that use infrared, ultrasonic, or other sensor technologies to detect proximity of another object, such as the ear. For example, an infrared or ultrasonic signal is emitted by the sensor, and the sensor waits for a reflection; based on the timing of the received reflection, or the presence/absence of the reflection, the sensor can detect whether an on-ear condition is present. Some such sensors can use more advanced techniques to detect a particular reflection signature that can distinguish between proximity to an ear (i.e., an on-ear condition) and proximity of other objects, such as a user's hand, a case or dock, etc. (i.e., an off-ear condition). Other on-ear sensors 210 can use one or more other sensor technologies, such as pressure sensors (e.g., to detect a pressure signature indicative of an on-ear condition), optical sensors (e.g., to detect an optical signature indicative of an on-ear condition), hall effect sensors (e.g., to detect a magnetic field signature indicative of an on-ear condition), piezoelectric sensors (e.g., to detect changes in deformation, pressure, or the like indicative of an on-ear condition), etc. Other on-ear sensors 210 use combinations of any of the above sensor technologies.

FIG. 2B shows another illustrative implementation of a mode detector 145 based on an inter-channel level difference (ILD) threshold detector 220 integrated therein. Embodiments of the ILD threshold detector 220) detect whether there is an on-ear condition (e.g., and/or whether there is an off-ear condition, and/or whether there is not an on-ear condition, and/or whether there is not an off-ear condition) and output the mode selection signal, accordingly. As illustrated, embodiments of the ILD threshold detector 220 receive input signals from the reference microphone 110 and the error microphone 115 (i.e., x(n) and e(n)), and a ratio (ILD) is computed between the two input signals. For example, the ILD is computed as a ratio of e(n) to x(n). In general, a high ILD (i.e., ILD exceeding a pre-calibrated threshold) indicates an on-ear condition because there tends to be a relatively large difference between the audio signals received by the reference microphone 110 and by the error microphone 115 when the wearable audio component is being worn. As a corollary, a low ILD (i.e., ILD not exceeding the pre-calibrated threshold) indicates an off-ear condition because the reference microphone 110 and the error microphone 115 tend to receive substantially similar audio signals when the wearable audio component is not being worn.

Returning to FIG. 1, output of the mode selection signal by the mode detector 145 indicates whether the wearable audio component is in an on-ear mode corresponding to detected presence of an on-ear condition by the mode detector 145, or in an off-ear mode corresponding to detected presence of an off-ear condition (e.g., or detected absence of an on-ear condition, etc.) by the mode detector 145. The mode selection signal can be passed to the howling detector 150 to cause tuning of the howling detector 150 based on the mode. For example, in response to the mode selection signal indicating the on-ear mode, the howling detector 150 can be tuned to operate with a lower false detection rate (e.g., at the expense of a longer detection latency). This can help to minimize disabling of the ANC responsive to false detection of howling events. Correspondingly, in response to the mode selection signal indicating the off-ear mode, the howling detector 150 can be tuned to operate with a faster detection latency (e.g., at the expense of a higher false detection rate). In the off-ear condition, the user's audio experience is of little or no concern; so there is similarly little or no concern about the potential of disabling the ANC responsive to false detection of howling events.

The mode selection signal is also passed to the howling suppressor 155 to cause suppression, based on the mode, by controlling the gain provided by the ANC gain block 135. For example, the amount (amplitude) of anti-noise signal generated by the ANC system 100 as output to the speaker 105 can effectively be controlled by using the howling suppressor 155 to control the gain at the ANC gain block 135. Accordingly, howling can be suppressed by adjusting the value of G. Embodiments assume that howling is highly unlikely in the off-ear condition. For example, in the off-ear condition, howling may be triggered by certain abnormal conditions, such as by the user tightly wrapping the wearable audio component in her hands, or by outside sounds when the ANC is in a transparency mode. As described below; embodiments of the howling suppressor 155 generally use a three-state approach to suppression, which can be adapted to the detected mode; reduce gain: hold gain: restore gain.

Figure 3:
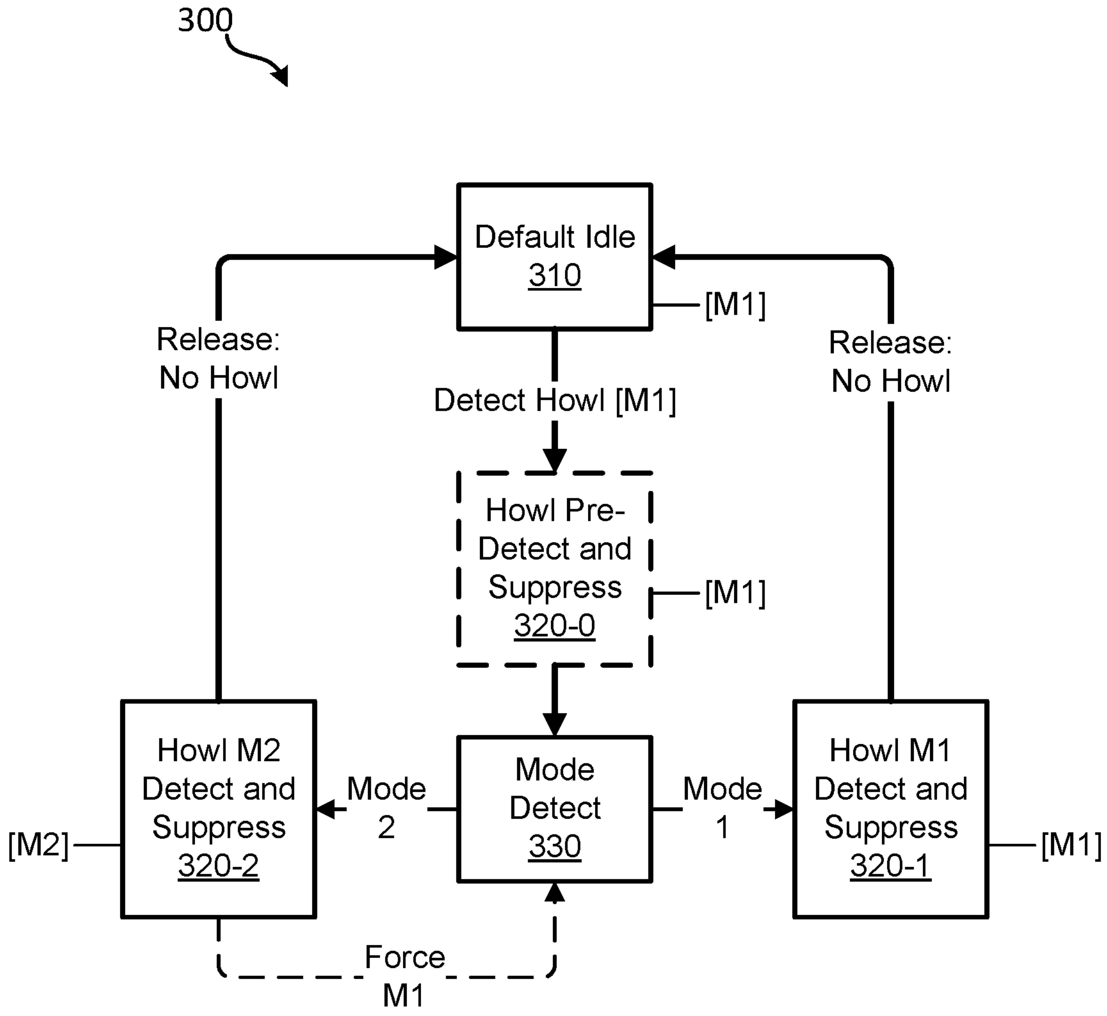
FIG. 3 shows a high-level operational flow diagram for operation of embodiments of an automated howling suppression (AHS) system.

FIG. 3 shows a high-level operational flow diagram 300 for operation of embodiments of an AHS system, such as the AHS system 140 of FIG. 1. As illustrated, the system is in a default idle stage 310, in which there is no howling. In some embodiments, in the default idle stage 310, the howling detector 150 is tuned for the on-ear mode ("M1"). For example, it is assumed that when ANC is active with audio playback, the user is wearing the wearable audio component in a normal fashion. Further, in the default idle stage 310, the howling suppressor 155 can be set for no suppression (e.g., directing full gain at the ANC gain block 135). If there continues to be no howling, the AHS system 140 remains in the default idle stage 310.

At some subsequent time, howling may be detected by the howling detector 150 (illustrated as "Detect Howling [M1]"). In response to such detection, embodiments of the flow diagram 300 move to a mode detect stage 330, in which the mode detector 145 determines whether the wearable audio component is presently in the on-ear condition or the off-ear condition and outputs the mode selection signal, accordingly. As described herein, this mode selection effectively adapts operation of the howling detector 150 and/or howling suppressor 155 as appropriate for the mode. As described with reference to FIGS. 1-2B, the mode detect stage 330 can use on-ear sensing. ILD threshold detection, and/or any other suitable approach to discriminating between the on-ear and off-ear conditions.

In some embodiments, as illustrated, the mode detect stage 330) is preceded by a howling pre-detect and suppress stage 320-0), in which the AHS system 140 controls the ANC output to suppress the present howling. In some embodiments, the AHS system 140 components are set to the on-ear mode in the howling pre-detect and suppress stage 320-0). Based on the present mode detected and selected in the mode detect stage 330, the flow diagram 300 can proceed either to a howling mode 1 (M1) detect and suppress stage 320-1, or to a howling mode 2 (M2) detect and suppress stage 320-2. In the howling M1 detect and suppress stage 320-1, the AHS system 140 uses on-ear mode settings to detect and suppress the present howling until full ANC functionality can be restored: at which time the AHS system 140 releases back to the default idle stage 310 (illustrated as "Release: No Howl"). In the howling M2 detect and suppress stage 320-2, the AHS system 140 uses off-ear mode settings to detect and suppress the present howling until full ANC functionality can be restored. Either the restoration is successful, and the AHS system 140 releases back to the default idle stage 310 (illustrated as "Release: No Howl"); or the restoration is unsuccessful, and the flow diagram 300 switches over to the howling M1 detect and suppress stage 320-1 (e.g., by forcing the mode detect stage to detect the on-ear mode).

Figure 4A:
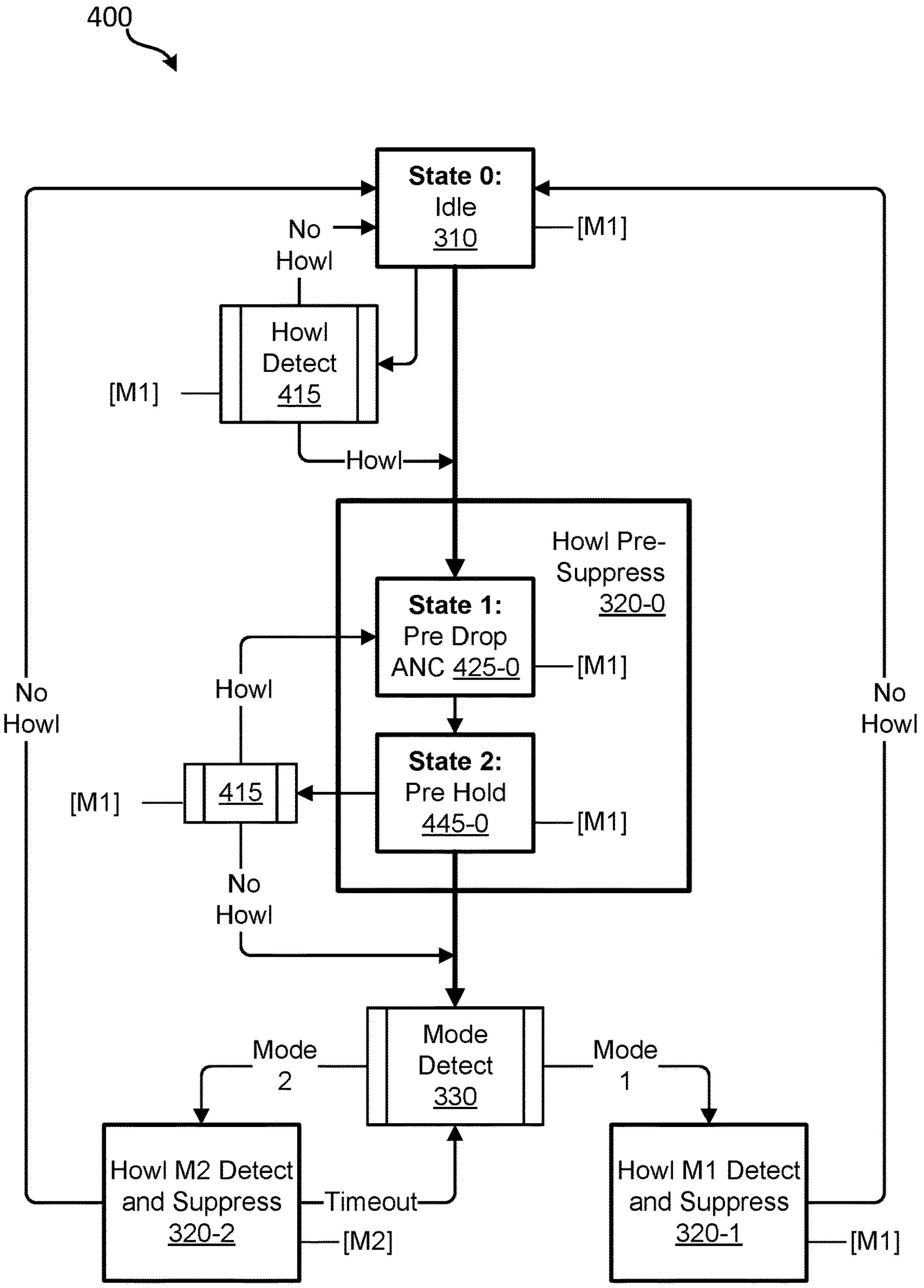
FIGS. 4A-4C show a state-wise operational flow diagram of embodiments of an AHS system implemented as a state machine.
Figure 4B:
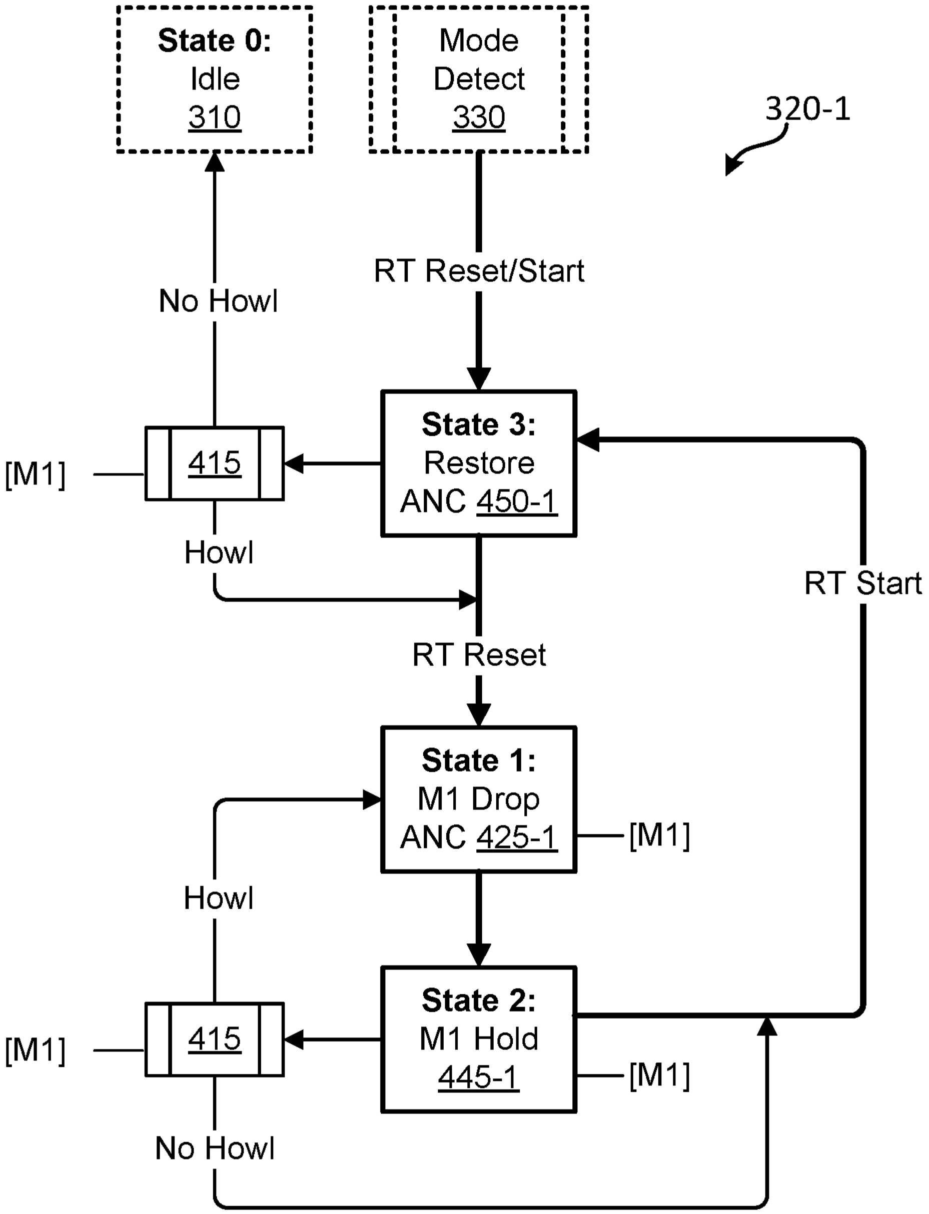
Figure 4C:
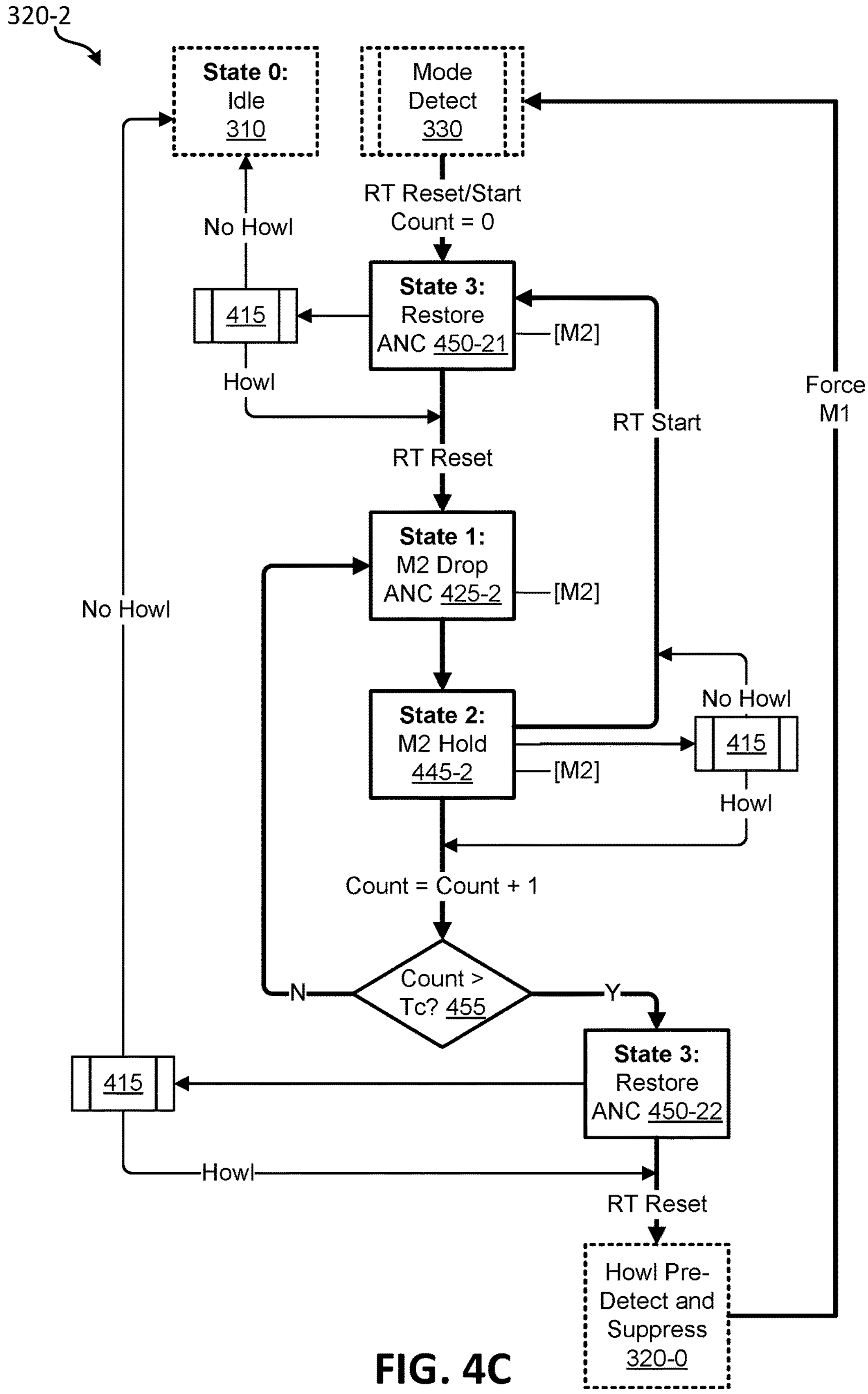

Implementations of the stages of FIG. 3 are described in more detail in FIGS. 4A-4C. In particular. FIGS. 4A-4C show a state-wise operational flow diagram 400 of embodiments of an AHS system 140 implemented as a state machine. The AHS system 140 can be an implementation of the AHS system 140 of FIG. 1 and/or of the flow diagram of FIG. 3 with the AHS system 140, or components thereof, implemented as a state machine. For example, the howling suppressor 155 is implemented as a state machine. Such a state machine can be implemented using any suitable hardware, software, firmware, or the like, or any suitable combination thereof. As one example, the howling suppressor 155 is implemented as part of an embedded digital electronic subsystem that includes digital logic components, such as flip-flops, multiplexers, combinational circuits, etc. Using a state machine implementation, the AHS system 140 can operate in any of a finite number of defined states, and predefined events trigger defined transitions between the states.

FIGS. 4A-4C show the howling suppressor 155 operating in, and transitioning between, four states: an idle (default) state, referred to as "State 0"; a state in which the howling suppressor 155 reduces the gain at the ANC gain block 135, referred to as "State 1"; a state in which the howling suppressor 155 holds the gain at the reduced level for some time while waiting for howling detection by the howling detector 150, referred to as "State 2"; and a state in which the howling suppressor 155 restores the gain of the ANC gain block 135, referred to as "State 3." As described in FIG. 3, operation of the AHS system 140 can proceed according to several stages. The howling suppressor 155 can transition to and/or between some of the same states in different stages of operation, although the particular settings for the state may be different in different stages. For example, the howling suppressor 155 operates in State 1 in each of the howling pre-detect and suppress stage 320-0), the howling M1 detect and suppress stage 320-1, and the howling M2 detect and suppress stage 320-2. For added clarity, each of these occurrences is labeled as "State 1" 425 with a stage-specific descriptor and reference designation appended.

Similar to FIG. 3, the AHS system 140 is normally in a default idle stage 310, in which there is no howling. As noted above, in terms of the state machine implementation, the default idle stage 310 corresponds with the howling suppressor 155 being in "State 0." In State 0, the howling suppressor 155 does not suppress any howling: the ANC is left to operate normally. Meanwhile, the howling detector 150 tuned to on-ear ("Mode 1," or "M1") settings to continually detect howling (illustrated as "howling detect" 415). For example, as described above, detection thresholds are set for slower triggering with lower false detection. If no howling is detected, the howling suppressor 155 remains in State 0. Detection of howling triggers transition to a howling pre-detect and suppress stage 320-0), such as described with reference to FIG. 3.

In the howling pre-detect and suppress stage 320-0), the howling suppressor 155 cycles for one or more iterations through State 1 425-0) (i.e., a stage-specific version of State 1 425, labeled as "Pre Drop ANC") and State 2 445-0) (i.e., a stage-specific version of State 2 445, labeled as "Pre Hold"). As illustrated, components can be set to Mode 1 (on-ear) tuning. In each iteration, an attack timer can be started in State 1 425-0), during which time the howling suppressor 155 reduces the total ANC output gain via the ANC gain block 135. When the attack timer is out (i.e., when a preset time elapses, an up-counter reaches a predetermined value, a down-counter reaches zero, etc.), the howling suppressor 155 transitions to State 2 445-0). In State 2 445-0), a check timer is started, during which time the howling suppressor 155 waits to see whether the howling detector 150) (tuned for on-ear mode) detects howling. If howling is detected, the check timer is cleared, the attack timer is reset, and the howling suppressor 155 transitions back to State 1 425-0) for another iteration. In some implementations, the first iteration of State 1 425-0) reduces the total ANC output gain to a lowest level (e.g., 140 decibels) to effectively disable the ANC. In such iterations, there may be no need for a State 2 445-0), as there cannot be any howling with the ANC effectively disabled. In other implementations, each iteration of State 1 425-0) reduces the total ANC output gain by an incremental amount (e.g., 10 decibels), until no howling is detected by the time the check timer is out in the corresponding iteration of State 2 445-0).

If there is no State 2 445-0), or if no howling is detected by the time the check timer is out, the AHS system 140 transitions to the mode detect stage 330, in which the mode detector 145 determines whether the wearable audio component is presently in the on-ear condition or the off-ear condition and outputs the mode selection signal, accordingly. As described herein, the mode detect stage 330) can use on-ear sensing. ILD threshold detection, and/or any other suitable 20) approach to discriminating between the on-ear and off-ear conditions. Though not explicitly shown, implementations relying on ILD threshold detection can obtain an ILD value upon triggering of the howling pre-detect and suppress stage 320-0). For example, prior to a first iteration of State 1 425-0), such implementations measure x(n) and e(n) and can compute a ratio. In such implementations, in the mode detect stage 330, the mode detector 145 can compare the obtained ILD value to the ILD threshold to determine whether the wearable audio component is presently in the on-ear condition or the off-ear condition.

As illustrated (and as described with reference to FIG. 3), the AHS system 140 transitions to one of the howling M1 detect and suppress stage 320-1 or the howling M2 detect and suppress stage 320-2 responsive to the output of the mode detect stage 330. In the howling M1 detect and suppress stage 320-1, the AHS system 140 uses on-ear mode settings to detect and suppress the present howling until full ANC functionality can be restored: at which time the AHS system 140 releases the howling suppressor 155 back to State 0 310. The howling M1 detect and suppress stage 320-1 is described more fully in FIG. 4B. In the howling M2 detect and suppress stage 320-2, the AHS system 140 uses off-ear mode settings to detect and suppress the present howling until full ANC functionality can be restored. Either the restoration is successful, and the AHS system 140 releases back to the State 0 310; or the restoration is unsuccessful (e.g., there is a timeout condition, as described below), and the AHS system 140 transitions over to the howling M1 detect and suppress stage 320-1 (e.g., via the mode detect stage 330). The howling M2 detect and suppress stage 320-2 is described more fully in FIG. 4C.

FIG. 4B shows an implementation of state-wise operation of the AHS system 140 in the howling M1 detect and suppress stage 320-1. State 0 310 and the mode detect stage 330 are shown for context, but are not part of the howling M1 detect and suppress stage 320-1. In the howling M1 detect and suppress stage 320-1, the components of the AHS system 140 are set to on-ear settings. In this stage, the howling suppressor 155 transitions to State 3 450-1 (i.e., a stage-specific version of State 3 450, labeled as "Restore ANC"). Embodiments can reset and start a release timer ("RT"), during which time the howling suppressor 155 restores the total ANC output gain via the ANC gain block 135 (e.g., to full ANC operation). Meanwhile, the howling detector 150 is using the on-ear mode settings to detect howling. If no howling is detected before the release timer is out (e.g., before full ANC functionality is restored), embodiments return to State 0 310.

If howling is detected by the howling detector 150 at any time prior to the release timer being out, the howling suppressor 155 transitions to State 1 425-1 (i.e., a stage-specific version of State 1 425, labeled as "M1 Drop ANC"). Embodiments can also clear and reset the release timer. The howling M1 detect and suppress stage 320-1 can commence by the howling suppressor 155 cycling for one or more iterations through State 1 425-1 and State 2 445-1 (i.e., a stage-specific version of State 2 445, labeled as "M1 Hold"). In each iteration, an attack timer can be started in State 1 425-1, during which time the howling suppressor 155 reduces the total ANC output gain via the ANC gain block 135. When the attack timer is out, the howling suppressor 155 transitions to State 2 445-1. In State 2 445-1, a check timer is started, during which time the howling suppressor 155 waits to see whether the howling detector 150 (tuned for on-ear mode) detects howling. If howling is detected, the check timer is cleared, the attack timer is reset, and the howling suppressor 155 transitions back to State 1 425-1 for another iteration. In some implementations, the first iteration of State 1 425-1 reduces the total ANC output gain to a lowest level (e.g., 140) decibels) to effectively disable the ANC. In such iterations, there may be no need for a State 2 445-1. In other implementations, each iteration of State 1 425-1 reduces the total ANC output gain by an incremental amount (e.g., 10 decibels), until no howling is detected by the time the check timer is out in the corresponding iteration of State 2 445-1. If there is no State 2 445-1, or if no howling is detected by the time the check timer is out, embodiments restart the release timer and return to State 3 450-1 (i.e., another attempt is made to restore the ANC functionality).

FIG. 4C shows an implementation of state-wise operation of the AHS system 140 in the howling M2 detect and suppress stage 320-2. State 0 310, the mode detect stage 330, and the howling pre-detect and suppress stage 320-0) are shown for context, but are not part of the howling M2 detect and suppress stage 320-2. In the howling M2 detect and suppress stage 320-2, the components of the AHS system 140 are set to off-ear settings (i.e., "Mode 2," "M2"). In this stage, the howling suppressor 155 transitions to State 3 450-21 (i.e., a first stage-specific version of State 3 450, labeled as "Restore ANC"). Embodiments can reset and start a release timer ("RT"), during which time the howling suppressor 155 restores the total ANC output gain via the ANC gain block 135 (e.g., to full ANC operation). Meanwhile, the howling detector 150 is using the off-ear mode settings to detect howling. If no howling is detected before the release timer is out (e.g., before full ANC functionality is restored), embodiments return to State 0 310.

If howling is detected by the howling detector 150 at any time prior to the release timer being out, the howling suppressor 155 transitions to State 1 425-2 (i.e., a stage-specific version of State 1 425, labeled as "M2 Drop ANC"). Embodiments can also clear and reset the release timer. Embodiments also reset a counter (e.g., Count=0). The resetting of the counter can occur upon transition to State 1 425-2, or at any suitable time prior (e.g., prior to State 3 450-21).

The howling M2 detect and suppress stage 320-2 can commence by the howling suppressor 155 cycling for one or more iterations through State 1 425-2 and State 2 445-2 (i.e., a stage-specific version of State 2 445, labeled as "M2 Hold"). In each iteration, an attack timer can be started in State 1 425-2, during which time the howling suppressor 155 reduces the total ANC output gain via the ANC gain block 135. When the attack timer is out, the howling suppressor 155 transitions to State 2 445-2. In State 2 445-2, a check timer is started, during which time the howling suppressor 155 waits to see whether the howling detector 150 (tuned for off-ear mode) detects howling. If no howling is detected by the time the check timer is out, embodiments restart the release timer and return to State 3 450-21 (i.e., another attempt is made to restore the ANC functionality).

If howling is detected, the check timer is cleared, the attack timer is reset, and the count is incremented (i.e., Count=Count+1). A determination is made (illustrated as block 455) as to whether the updated count exceeds a predetermined count threshold, Tc. For example, Tc can be set to '5' to limit the howl M2 detect and suppress stage 320-2 to five iterations. If the updated count has not exceeded the count threshold, and the howling suppressor 155 transitions back to State 1 425-2 for another iteration. In some implementations, the first iteration of State 1 425-2 reduces the total ANC output gain to a predetermined intermediate level (e.g., −20 decibels) at which it is highly unlikely that there would be any howling in the off-ear condition. In other implementations, each iteration of State 1 425-2 reduces the total ANC output gain by an incremental amount (e.g., −5 decibels).

If the updated count has exceeded the count threshold, embodiments can once again seek to restore ANC functionality by transitioning to State 3 450-22 (i.e., a second stage-specific version of State 3 450, also labeled as "Restore ANC"). Embodiments can reset and start a release timer ("RT"), during which time the howling suppressor 155 restores the total ANC output gain via the ANC gain block 135 (e.g., to full ANC operation). Meanwhile, the howling detector 150 is using the off-ear mode settings to detect howling. If no howling is detected before the release timer is out (e.g., before full ANC functionality is restored), embodiments return to State 0 310.

If howling is detected by the howling detector 150 at any time prior to the release timer being out, the AHS system 140 transitions over to the howl M1 detect and suppress stage 320-1. For example, such a condition can indicate that the initial mode determination (i.e., off-ear mode) was incorrect, and that the on-ear mode should have been selected. In the illustrated implementation, the release timer is reset, and the AHS system 140 returns to the howl pre-detect and suppress stage 320-0 (i.e., to re-suppress the howling). Upon returning to the mode detect stage 330), the AHS system 140 forces a determination of the on-ear mode. For example, an ILD value can be fabricated, or a sensor reading can be fabricated to ensure such a determination by the mode detector 145. In another implementation, the howling suppressor 155 can disable ANC functionality, components can be set to on-ear settings, the release timer can be reset, and the howl M1 detect and suppress stage 320-1 can commence directly. In another implementation, the howling suppressor 155 can disable ANC functionality, the AHS system 140 can return to the mode detect stage 330) and can force selection of the on-ear mode.

Figure 5:
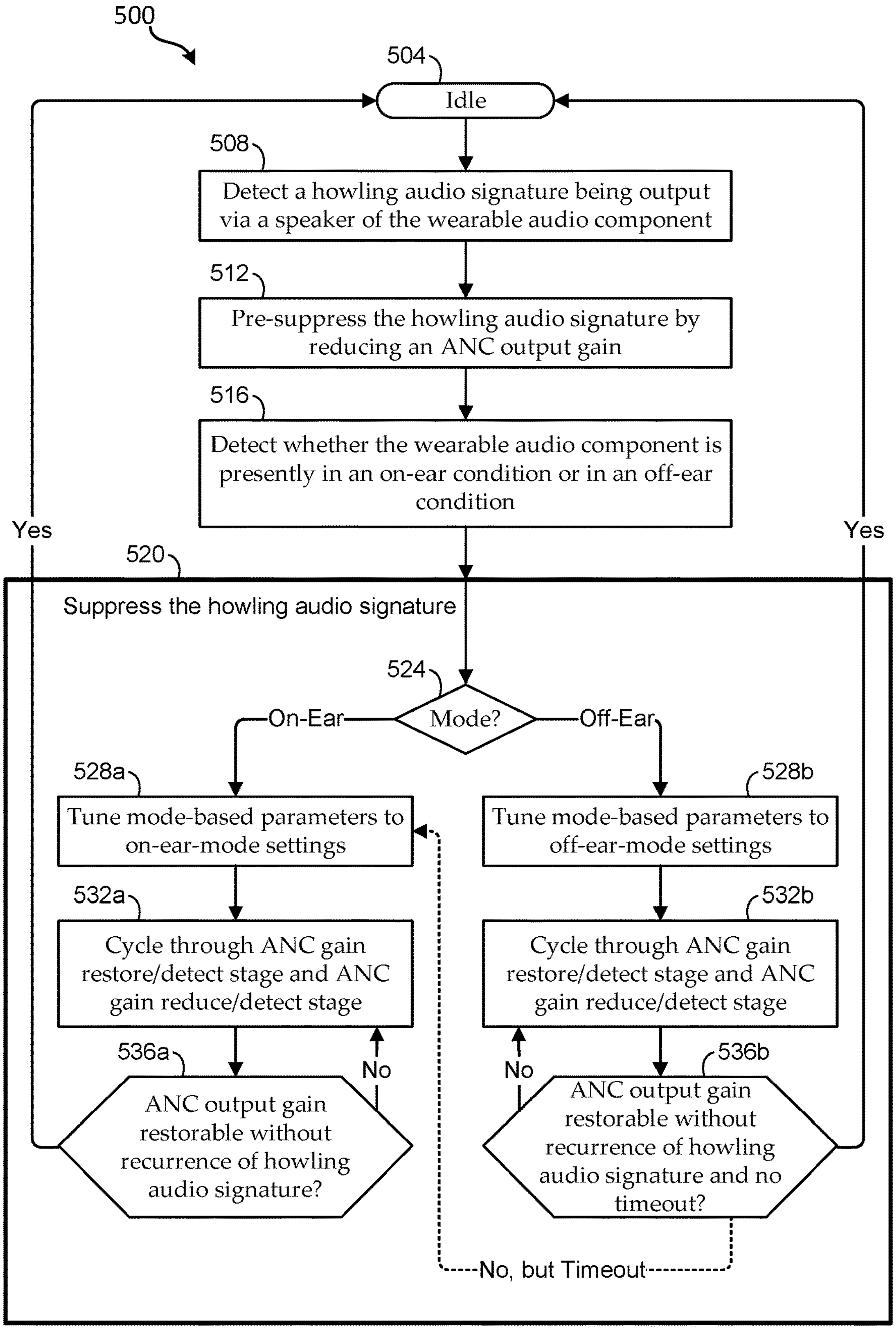
FIG. 5 shows a flow diagram of an illustrative method for adaptive howling suppression, according to embodiments described herein.

FIG. 5 shows a flow diagram of an illustrative method 500 for adaptive howling suppression, according to embodiments described herein. Embodiments of the method 500 can be implemented in an active noise control (ANC) system of a wearable audio component, such as an earbud. As illustrated, embodiments can begin at an idle stage 504, such as with a howling suppressor of an adaptive howling suppression (AHS) system in an idle state. At stage 508, embodiments can detect a howling audio signature being output via a speaker of the wearable audio component. For example, until the howling audio signature is detected at stage 508, the method 500 can remain idle at stage 504. In some embodiments, the detecting at stage 508 is according to on-ear-mode settings, as described herein. At stage 512, embodiments can pre-suppress the detected howling audio signature by reducing an ANC output gain. Embodiments of the pre-suppression at stage 512 can be implemented as described with reference to the howl pre-detect and suppress stage 320-0) of FIG. 4A.

At stage 516, embodiments can detect (e.g., responsive to the detecting at stage 508) whether the wearable audio component is presently in an on-ear condition or in an off-ear condition. In some embodiments, the detecting at stage 516 includes computing a present inter-channel difference (ILD) value, after the detecting at stage 508 and prior to the pre-suppressing at stage 512, as a ratio between an error audio signal received from an error microphone of the wearable audio component and a reference audio signal received from a reference microphone of the wearable audio component. Such embodiments can then compare the present ILD value to a pre-calibrated ILD threshold, such that the detecting at stage 516 yields that the wearable audio component is presently in the on-ear condition responsive to the present ILD value exceeding the ILD threshold, and the detecting at stage 516 yields that the wearable audio component is presently in the off-ear condition responsive to the present ILD value not exceeding the ILD threshold. In other embodiments, the detecting at stage 516 includes using an on-ear sensor to sense whether the wearable audio component is presently being worn, such that the detecting at stage 516 yields that the wearable audio component is presently in the on-ear condition responsive to sensing that the wearable audio component is presently being worn, and the detecting at stage 516 yields that the wearable audio component is presently in the off-ear condition otherwise.

At stage 520, responsive to and in accordance with the detecting at stage 516, embodiments can suppress the howling audio signature by performing stages 524-536. In particular, at stage 524, embodiments can select either an on-ear mode path or an off-ear mode path corresponding to the condition determined in stage 516. In the on-ear path, the method 500 performs stages 528-536 as stages **528*a*-536*a*; in the off-ear path, the method 500 performs stages 528-536 as stages 528*b*-536*b***.

In the on-ear path, at stage **528*a*, embodiments can tune a set of mode-based parameters to on-ear-mode settings. At stage 532*a*, embodiments can cycle through a set of suppression stages according to the on-ear-mode settings. The set of suppression stages includes one or more iterations of an ANC gain restore/detect stage and an ANC gain reduce/detect stage. Embodiments of the suppression at stage 532*a* can be implemented as described with reference to the howl M1 detect and suppress stage 320-1 of FIG. 4B. The cycling can iterate until it is determined that the ANC output gain is restorable without recurrence of the howling audio signature. For example, at stage 536*a*, embodiments can determine whether the ANC output gain is restorable without recurrence of the howling audio signature. If not, embodiments can return to stage 532*a* for another iteration. If so, embodiments can return to the idle stage 504. For example, returning to the idle stage 504 can be implemented by releasing the ANC system back to the idle state responsive to the detecting in stage 536*a***.

In some embodiments, the cycling at stage **532*a*** includes: (a) performing the ANC gain restore/detect stage to detect whether the ANC output gain is restorable without recurrence of the howling audio signature: (b) responsive to determining that the ANC output gain is restorable without recurrence of the howling audio signature, releasing the ANC system back to the idle state; and (c) responsive to determining that the ANC output gain is not restorable without recurrence of the howling audio signature, performing the ANC gain reduce/detect stage. Step (c) can include: (c1) reducing the ANC output gain by a reduction amount to a reduced ANC output gain: (c2) detecting whether the howling audio signature is present at the reduced ANC output gain: (c3) responsive to detecting that the howling audio signature is not present at the reduced ANC output gain, returning to step (a); and (c4) responsive to detecting that the howling audio signature is present at the reduced ANC output gain, returning to step (c1). In some such embodiments, the detecting in steps (a) and (c2) is based on at least one detection threshold tuned for the on-ear mode as part of the set of mode-based parameters. In some such embodiments, the reduction amount in step (c1) is tuned for the on-ear mode as part of the set of mode-based parameters. For example, the reduction is to −140 decibels (or some other maximum negative level) in a single step (i.e., the reduction amount is equal to the maximum negative level), or in parameter-specified increments.

In the off-ear path, at stage **528*b*, embodiments can tune a set of mode-based parameters to off-ear-mode settings. At stage 532*b*, embodiments can cycle through a set of suppression stages according to the off-ear-mode settings. The set of suppression stages includes one or more iterations of an ANC gain restore/detect stage and an ANC gain reduce/detect stage. Embodiments of the suppression at stage 532*b* can be implemented as described with reference to the howl M2 detect and suppress stage 320-2 of FIG. 4C. The cycling can iterate up to a maximum number of times, or until it is determined that the ANC output gain is restorable without recurrence of the 30) howling audio signature. For example, at stage 536*b*, embodiments can determine whether the ANC output gain is restorable without recurrence of the howling audio signature and whether the maximum number of iterations (i.e., "timeout") has been reached. If the ANC output gain cannot be restored without howling and there is no timeout condition, embodiments can return to stage 532*b* for another iteration. If ANC output gain can be restored without howling and there is no timeout, embodiments can return to the idle stage 504. For example, returning to the idle stage 504 can be implemented by releasing the ANC system back to the idle state responsive to the detecting in stage 536*b*. If ANC output gain cannot be restored without howling, but there is a timeout condition, embodiments can switch over to on-ear mode for further howling suppression. For example, as illustrated, embodiments can proceed to stage 528*a***.

In some embodiments, the cycling at stage **532*b* includes: (a) performing the ANC gain restore/detect stage to detect whether the ANC output gain is restorable without recurrence of the howling audio signature: (b) responsive to determining that the ANC output gain is restorable without recurrence of the howling audio signature, releasing the ANC system back to the idle state; and (c) responsive to determining that the ANC output gain is not restorable without recurrence of the howling audio signature, performing the ANC gain reduce/detect stage. Step (c) can include: (c1) setting an iteration counter to zero: (c2) reducing the ANC output gain by a reduction amount to a reduced ANC output gain: (c3) detecting whether the howling audio signature is present at the reduced ANC output gain: (c4) responsive to detecting that the howling audio signature is not present at the reduced ANC output gain, returning to step (a): (c5) responsive to detecting that the howling audio signature is present at the reduced ANC output gain, determining whether the iteration counter equals a predetermined maximum count: (c6) responsive to determining that the iteration counter does not equal the predetermined maximum count, returning to step (c2); and (c7) responsive to determining that the iteration counter equals the predetermined maximum count, re-performing at least the suppressing the howling audio signature based on forcing detecting that the wearable audio component is presently in the on-ear condition. In some such embodiments, the detecting in steps (a) and (c3) is based on at least one detection threshold tuned for the off-ear mode as part of the set of mode-based parameters. In some such embodiments, the reduction amount in step (c2) is tuned for the off-ear mode as part of the set of mode-based parameters. For example, the pre-suppressing in stage 512 reduces the ANC output gain to a maximum negative level of −X decibels, and the off-ear reduction amount and the iteration counter are tuned so that when the iteration counter equals the maximum count, the reduced ANC output gain is at −Y decibels, where Y<X/2 (e.g., the maximum negative level is −140 decibels, and the reduced ANC output gain at timeout is −20 decibels). In some embodiments, the re-performing at step (c7) involves: re-performing the pre-suppressing at stage 512: re-performing the detecting at stage 516, however by forcing the detecting to yield that the wearable audio component is presently in the on-ear condition; and re-performing the suppressing at stage 520 based on the re-performing the detecting at stage 516**.

As described herein, the set of mode-based parameters includes at least one detection threshold having a first value according to the on-ear-mode settings and a second value according to the off-ear-mode settings, where the first and second values are different. For example, the detection threshold is higher in the on-ear-mode settings so that the on-ear howling detection has fewer false detections (e.g., although it can be slower to detect) and the off-ear howling detection can be faster to detect (e.g., although with more likelihood for false detections). Each of the detecting at stage 508, cycling at stage **532*a* (i.e., the ANC gain reduce/detect stage and the ANC gain restore/detect stage for the on-ear condition), cycling at stage 532*b*** (i.e., the ANC gain reduce/detect stage and the ANC gain restore/detect stage for the off-ear condition) includes detecting whether the howling audio signature is exceeding the detection threshold at its tuned mode-dependent value. In some embodiments, such detection involves: detecting, in a power spectrum of an error audio signal received from an error microphone of the wearable audio component, a peak/neighbor ratio as a ratio of a highest peak level and peak levels over a surrounding frequency range; and determining whether the peak/neighbor ratio exceeds a pre-calibrated peak/neighbor threshold. In other embodiments, such detection involves: detecting, in a power spectrum of an error audio signal received from an error microphone of the wearable audio component, a harmonic peak ratio as a ratio of a main peak level at a fundamental frequency to peak levels at one or more harmonic frequencies of the fundamental frequency; and determining whether the harmonic peak ratio exceeds a pre-calibrated harmonic peak threshold. In other embodiments, such detection involves: detecting, for time-based samples of an error audio signal received from an error microphone of the wearable audio component, a number of out-of-limit samples as a count of the time-based samples over a time window having amplitudes exceeding a pre-defined amplitude limit; and determining whether the number of out-of-limit samples exceeds a pre-calibrated limit threshold. In other embodiments, such detection involves any one or more of the above techniques. For example, the detecting involves determining, for an error audio signal received from an error microphone of the wearable audio component whether a peak/neighbor ratio exceeds a pre-calibrated peak/neighbor threshold, whether a harmonic peak ratio exceeds a pre-calibrated harmonic peak threshold, and/or whether a number of out-of-limit samples exceeds a pre-calibrated limit threshold.

Figure 6:
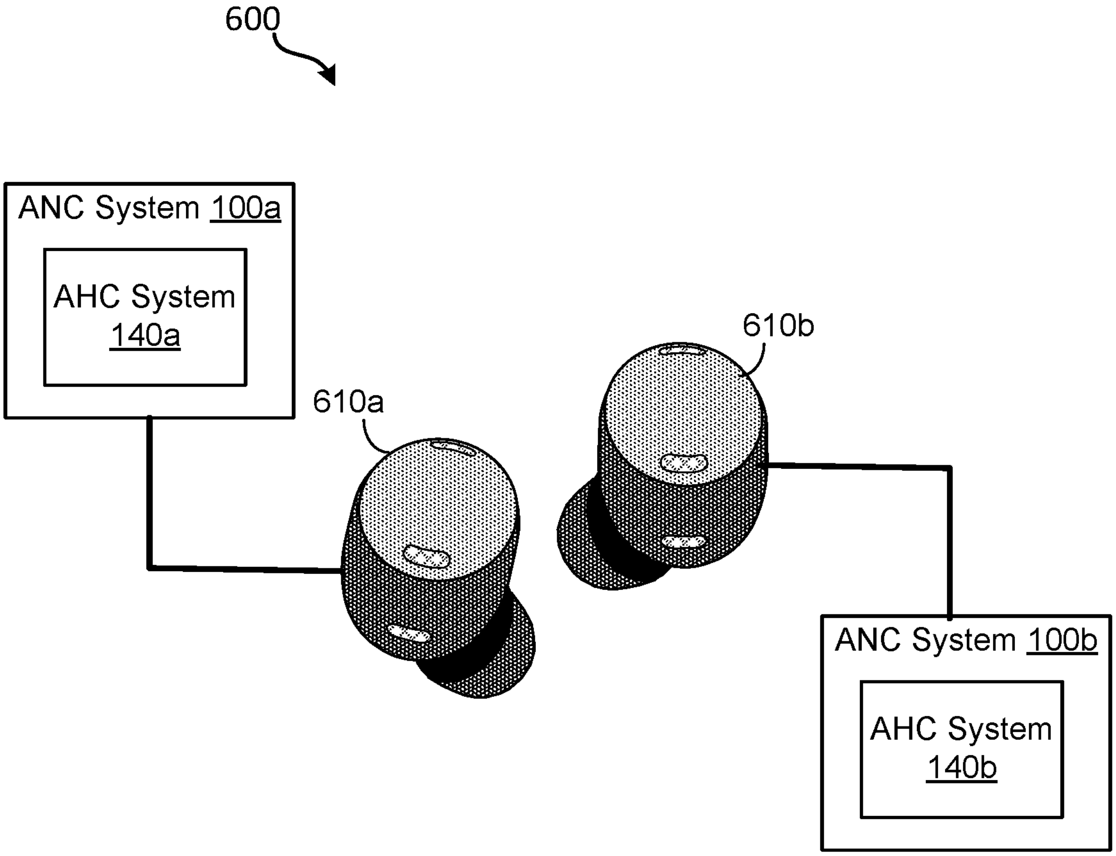
FIG. 6 shows an illustrative embodiment of a wearable audio context for AHS.

The systems and methods described above can be implemented in any suitable wearable electronic audio component. FIG. 6 shows an illustrative embodiment of a wearable audio context 600 for automated howling suppression (AHS). The illustrated context 600 includes an illustrative pair of earbuds 610. Each earbud 610 has a respective instance of an active noise control (ANC) system 100, such as the ANC system 100 of FIG. 1, that includes a respective instance of an AHS system 140. Though not explicitly shown, each earbud 610 has, integrated therein, an instance of the speaker 105, the reference microphone 110, the error microphone 115, and one or more processors. The one or more processors implements components of the respective ANC system 100 instance, including components of the respective AHS system 140 instance. For example, though not explicitly shown, each earbud 610 includes a non-transitory processor-readable medium having processor-executable instructions stored thereon. When executed, the instructions cause the set of processors to implement at least features of the AHS system 140 (e.g., features of the mode detector 145, the howling detector 150, and the howling suppressor 155, as described herein). As described herein, some embodiments of the howling suppressor 155 are implemented as a state machine.

Embodiments are described above in the context of earbuds operating in a normal mode, such as where a user is listening to desired audio with ANC being used to minimize ambient noise. Techniques described herein can similarly operate in other contexts. One such context is when using earbuds with ANC in transparency mode. Another such context is using earbuds in a hearing aid mode. Another such context is where the wearable audio component is a hearing aid.

Embodiments described herein provide several features. One feature is that embodiments can adaptively optimize the howling detection tunings for different situations. For example, when howling risk is low, the howling detection is tuned to have a low false trigger rate and a long detection time, as ambient noise and playback sound will not tend to cause false detection. When the possibility of howling is high, the howling detection is tuned to have a high false trigger rate and short detection time. This can help to stop howling early and improve user experience. Another feature is that embodiments suppress howling by modifying the total anti-noise gain. Unlike conventional approaches that rely on feed-forward howling suppression techniques (e.g., notch filtering) and can only suppress FFANC-based howling, novel approaches described herein do not tend to introduce distortions to the ANC system output in normal conditions and can suppress both FFANC and FBANC howling.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for adaptive howling suppression in an active noise control (ANC) system of a wearable audio component, the method comprising:

first detecting, while the ANC system is in an idle state, a howling audio signature being output via a speaker of the wearable audio component;

pre-suppressing the howling audio signature by reducing an ANC output gain;

second detecting, responsive to the first detecting, whether the wearable audio component is presently in an on-ear condition or in an off-ear condition; and suppressing the howling audio signature by:

tuning a set of mode-based parameters to on-ear-mode settings responsive to second detecting that the wearable audio component is presently in the on-ear condition, or to off-ear-mode settings responsive to second detecting that the wearable audio component is presently in the off-ear condition; and cycling through a set of suppression stages according to the set of mode-based parameters until third determining that the ANC output gain is restorable without recurrence of the howling audio signature, the set of suppression stages comprising an ANC gain reduce/detect stage and an ANC gain restore/detect stage.

2. The method of claim 1, further comprising:

releasing the ANC system back to the idle state responsive to the third detecting.

3. The method of claim 1, wherein the cycling through a set of suppression stages comprises, responsive to second detecting that the wearable audio component is presently in the on-ear condition:

(a) performing the ANC gain restore/detect stage to detect whether the ANC output gain is restorable without recurrence of the howling audio signature;

(b) responsive to determining that the ANC output gain is restorable without recurrence of the howling audio signature, releasing the ANC system back to the idle state; and (c) responsive to determining that the ANC output gain is not restorable without recurrence of the howling audio signature, performing the ANC gain reduce/detect stage by:

(c1) reducing the ANC output gain by a reduction amount to a reduced ANC output gain;

(c2) detecting whether the howling audio signature is present at the reduced ANC output gain;

(c3) responsive to detecting that the howling audio signature is not present at the reduced ANC output gain, returning to step (a); and (c4) responsive to detecting that the howling audio signature is present at the reduced ANC output gain, returning to step (c1).

4. The method of claim 3, wherein:

the detecting in steps (a) and (c2) is based on at least one detection threshold tuned for the on-ear mode as part of the set of mode-based parameters; and the reduction amount in step (c1) is tuned for the on-ear mode as part of the set of mode-based parameters.

5. The method of claim 1, wherein the cycling through a set of suppression stages comprises, responsive to second detecting that the wearable audio component is presently in the off-ear condition:

(a) performing the ANC gain restore/detect stage to detect whether the ANC output gain is restorable without recurrence of the howling audio signature;

(b) responsive to determining that the ANC output gain is restorable without recurrence of the howling audio signature, releasing the ANC system back to the idle state; and (c) responsive to determining that the ANC output gain is not restorable without recurrence of the howling audio signature, performing the ANC gain reduce/detect stage by:

(c1) setting an iteration counter to zero;

(c2) reducing the ANC output gain by a reduction amount to a reduced ANC output gain;

(c3) detecting whether the howling audio signature is present at the reduced ANC output gain;

(c4) responsive to detecting that the howling audio signature is not present at the reduced ANC output gain, returning to step (a);

(c5) responsive to detecting that the howling audio signature is present at the reduced ANC output gain, determining whether the iteration counter equals a predetermined maximum count;

(c6) responsive to determining that the iteration counter does not equal the predetermined maximum count, returning to step (c2); and (c7) responsive to determining that the iteration counter equals the predetermined maximum count, re-performing at least the suppressing the howling audio signature based on forcing detecting that the wearable audio component is presently in the on-ear condition.

6. The method of claim 5, wherein:

the detecting in steps (a) and (c3) is based on at least one detection threshold tuned for the off-ear mode as part of the set of mode-based parameters; and the reduction amount in step (c2) is tuned for the off-ear mode as part of the set of mode-based parameters.

7. The method of claim 5, wherein the re-performing at step (c7) comprises:

re-performing the pre-suppressing;

re-performing the second detecting by forcing the second detecting to yield that the wearable audio component is presently in the on-ear condition; and re-performing the suppressing the howling audio signature based on the re-performing the second detecting.

8. The method of claim 5, wherein:

the pre-suppressing comprises reducing the ANC output gain to a maximum negative level of $-X$ decibels; and the reduction amount and the iteration counter are tuned so that when the iteration counter equals the maximum count, the reduced ANC output gain is at $-Y$ decibels, where $Y<X/2$.

9. The method of claim 1, wherein the second detecting comprises:

computing a present inter-channel difference (ILD) value, after the first detecting and prior to the pre-suppressing, as a ratio between an error audio signal received from an error microphone of the wearable audio component and a reference audio signal received from a reference microphone of the wearable audio component; and comparing the present ILD value to a pre-calibrated ILD threshold, such that the second detecting yields that the wearable audio component is presently in the on-ear condition responsive to the present ILD value exceeding the ILD threshold, and the second detecting yields that the wearable audio component is presently in the off-ear condition responsive to the present ILD value not exceeding the ILD threshold.

10. The method of claim 1, wherein the second detecting comprises:

using an on-ear sensor to sense whether the wearable audio component is presently being worn, such that the second detecting yields that the wearable audio component is presently in the on-ear condition responsive to sensing that the wearable audio component is presently being worn, and the second detecting yields that the wearable audio component is presently in the off-ear condition otherwise.

11. The method of claim 1, wherein the first detecting is according to the on-ear-mode settings.

12. The method of claim 1, wherein:

the set of mode-based parameters comprises at least one detection threshold having a first value according to the on-ear-mode settings and a second value according to the off-ear-mode settings, the first and second values being different; and each of the first detecting, the ANC gain reduce/detect stage, and the ANC gain restore/detect stage comprises detecting whether the howling audio signature is exceeding the detection threshold.

13. The method of claim 12, wherein the detecting whether the howling audio signature is exceeding the detection threshold comprises:

detecting, in a power spectrum of an error audio signal received from an error microphone of the wearable audio component, a peak/neighbor ratio as a ratio of a highest peak level and peak levels over a surrounding frequency range; and determining whether the peak/neighbor ratio exceeds a pre-calibrated peak/neighbor threshold.

14. The method of claim 12, wherein the detecting whether the howling audio signature is exceeding the detection threshold comprises:

detecting, in a power spectrum of an error audio signal received from an error microphone of the wearable audio component, a harmonic peak ratio as a ratio of a main peak level at a fundamental frequency to peak levels at one or more harmonic frequencies of the fundamental frequency; and determining whether the harmonic peak ratio exceeds a pre-calibrated harmonic peak threshold.

15. The method of claim 12, wherein the detecting whether the howling audio signature is exceeding the detection threshold comprises:

detecting, for time-based samples of an error audio signal received from an error microphone of the wearable audio component, a number of out-of-limit samples as a count of the time-based samples over a time window having amplitudes exceeding a predefined amplitude limit; and determining whether the number of out-of-limit samples exceeds a pre-calibrated limit threshold.

16. The method of claim 12, wherein the detecting whether the howling audio signature is exceeding the detection threshold comprises determining, for an error audio signal received from an error microphone of the wearable audio component whether a peak/neighbor ratio exceeds a pre-calibrated peak/neighbor threshold, whether a harmonic peak ratio exceeds a pre-calibrated harmonic peak threshold, and/or whether a number of out-of-limit samples exceeds a pre-calibrated limit threshold.

17. An adaptive howling suppression (AHS) system for integration in an active noise control (ANC) system of a wearable audio component, the AHS system comprising:

a mode detector;

a howling detector coupled with the mode detector and configured to couple with an error microphone of the wearable audio component; and a howling suppressor coupled with the mode detector and the howling detector and configured to couple with an ANC gain block of the ANC system, wherein:

the howling detector is further configured to first detect, while the howling suppressor is in an idle state, a howling audio signature being output via a speaker of the wearable audio component;

the howling suppressor is further configured to pre-suppress the howling audio signature by reducing an ANC output gain of the ANC gain block responsive to the first detecting;

the mode detector is configured to second detect, responsive to the first detecting, whether the wearable audio component is presently in an on-ear condition or in an off-ear condition; and the howling suppressor is further configured to suppress the howling audio signature by:

tuning a set of mode-based parameters to on-ear-mode settings responsive to the mode detector second detecting that the wearable audio component is presently in the on-ear condition, or to off-ear-mode settings responsive to the mode detector second detecting that the wearable audio component is presently in the off-ear condition; and cycling through a set of suppression stages according to the set of mode-based parameters until the howling detector third determines that the ANC output gain is restorable without recurrence of the howling audio signature, the set of suppression stages comprising an ANC gain reduce/detect stage and an ANC gain restore/detect stage.

18. The AHS system of claim 17, wherein the mode detector is further configured to couple with an on-ear sensor of the wearable audio component to perform the second detecting by sensing whether the wearable audio component is in the on-ear condition or in the off-ear condition.

19. An active noise control (ANC) system of a wearable audio component, the ANC system comprising the AHS system of claim 17.

20. A wearable audio component comprising the ANC system of claim 18.

* * * * *